United States Patent [19]

Sherer

[11] 4,185,525
[45] Jan. 29, 1980

[54] METHOD OF AND APPARATUS FOR CUTTING SUBSTANTIALLY VERTICALLY DISPOSED PIPE

[76] Inventor: Charles R. Sherer, 4129-C Southerland Rd., Houston, Tex. 77092

[21] Appl. No.: 845,861

[22] Filed: Oct. 31, 1977

[51] Int. Cl.² .......................... B23B 5/08; B23B 5/14
[52] U.S. Cl. ......................................... 82/4 C; 30/97
[58] Field of Search ................. 82/4 C, 1 C; 144/205; 30/97

[56] References Cited

U.S. PATENT DOCUMENTS

| 2,271,582 | 2/1942 | Dixon | 82/4 C |
| 2,679,686 | 6/1954 | Ingwer et al. | 82/4 C |
| 3,720,260 | 3/1973 | Duck et al. | 30/97 |
| 3,762,246 | 10/1973 | Becker | 82/4 C |
| 3,807,047 | 4/1974 | Sherer et al. | 30/97 |
| 3,840,170 | 10/1974 | Arikawa et al. | 30/97 |
| 3,942,248 | 3/1976 | Sherer et al. | 30/97 |

Primary Examiner—Leonidas Vlachos
Attorney, Agent, or Firm—Guy E. Matthews

[57] ABSTRACT

A method of and apparatus for cutting substantially vertically disposed pipe is disclosed. The substantially vertically disposed pipe is cut by positioning a receiving member around the pipe at a predetermined distance from the desired cutting plane. A cutting element is mounted on a frame for moving circularly around and radially toward the pipe and the frame includes supports for locating the cutting element at a predetermined distance from the receiving member and for supporting the frame uniformly about the pipe. The frame is positioned around the pipe and the supports are mounted on the receiving member to locate the cutting element within the desired cutting plane. The frame is then prevented from moving relative to the vertically disposed pipe and the cutting element is moved circularly around and radially toward the pipe to cut the pipe along the desired cutting plane at the predetermined distance from the pipe receiving member.

20 Claims, 6 Drawing Figures

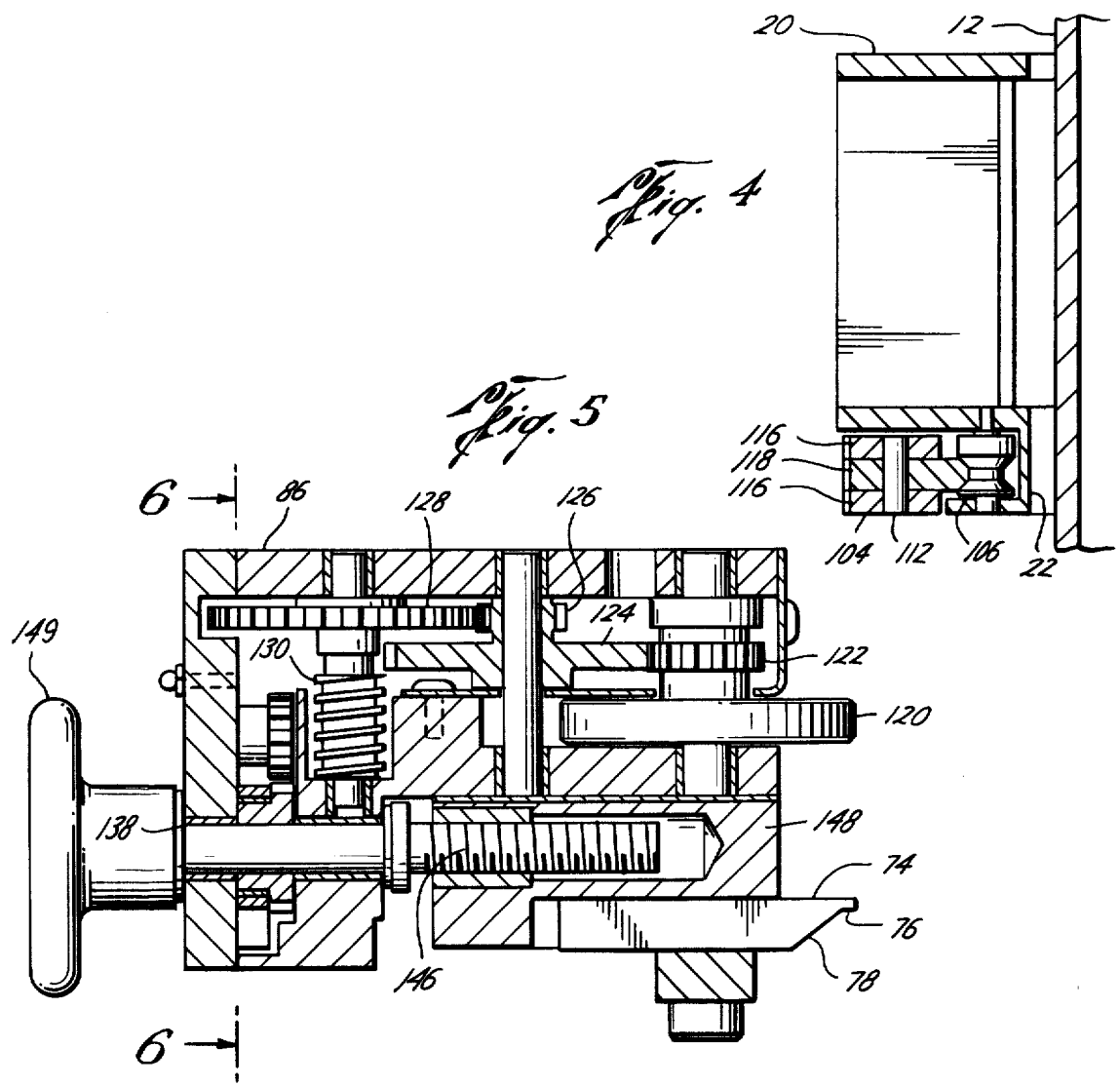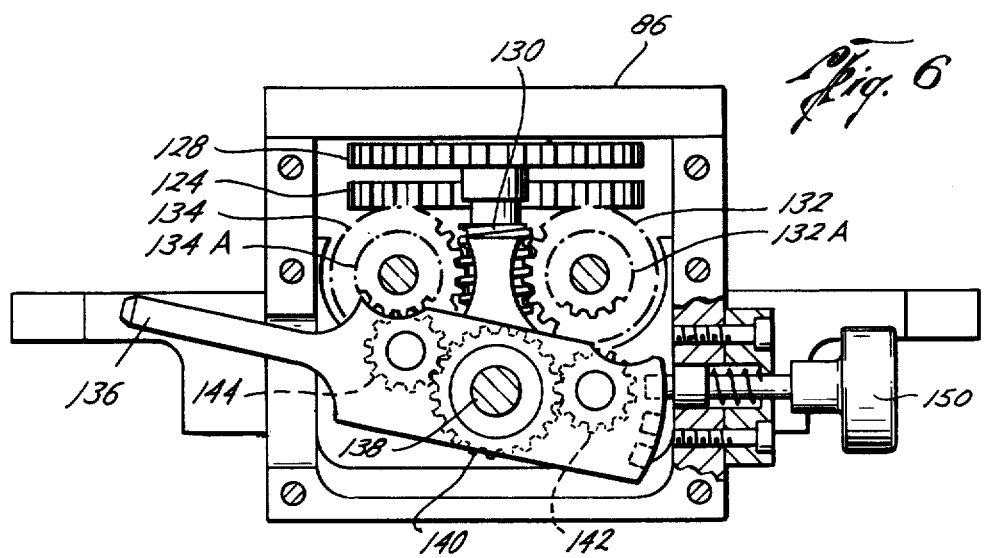

METHOD OF AND APPARATUS FOR CUTTING SUBSTANTIALLY VERTICALLY DISPOSED PIPE

BACKGROUND AND BRIEF SUMMARY OF THE INVENTION

The cutting of pipe to obtain specified lengths is well known. However, in certain situations it is impossible to determine with accuracy the length of pipe which is needed to complete the task. For instance, when drilling wells the final length of casing cannot be determined until the casing string has been run into the bore hole. Thus, the final section of casing is cut when vertically disposed within the bore hole because of the inefficiency in withdrawing the section, laying it horizontal, cutting the casing and then rerunning the section into the bore hole.

To eliminate this inefficiency, it has been the practice in the drilling industry to use a cutting torch for cutting the casing. This however requires that the casing be machined to correct for any irregularities along the cut periphery so that well head apparatus, such as flanges, casing spools and casing heads may be properly attached to the casing. Further, the casing quite frequently has drilling mud and other fluids disposed therein so that as the casing is cut the fluids flow out from within the casing and extinguish the torch. Further, in the drilling of oil and gas wells, it is not desireable to have an ignited cutting torch at the well head where gas leaks could cause fires. Further, when using a cutting torch to cut the vertically disposed pipe, it is extremely difficult to obtain a uniformly disposed cut around the pipe. This is especially true when one realizes that the diameter of well casing may be from two inches to about ten or more feet.

Accordingly, it is an object of the present invention to provide a method of and apparatus for cutting substantially vertically disposed pipe.

Further, it is an object of the present invention to provide a method of and apparatus for cutting substantially vertically disposed pipe along a desired cutting plane at a predetermined distance from a receiving member which mounts a cutter in the cutting plane.

Further, it is an object of the present invention to provide a method of and apparatus for cutting substantially vertically disposed pipe with apparatus which eliminates the fire hazard of an ignited torch.

Further, it is an object of the present invention to provide a method of and apparatus for cutting substantially vertically disposed pipe which uses a cutting element and a single means for moving the cutting element for use over a wide range of pipe diameters.

More particularly, it is an object of the present invention to provide a method of and apparatus for cutting vertically disposed well casing.

Further, it is an object of the present invention to provide a method of and apparatus for cutting substantially vertically disposed well casing at a predetermined distance above a casing head flange so that various well head apparatus my be attached thereto without interference from said casing.

Further, it is an object of the present invention to provide a method of and apparatus for cutting substantially vertically disposed well casing with apparatus which eliminates the fire hazard of an ignited torch.

Further, it is an object of the present invention to provide a method of and apparatus for cutting substantially vertically disposed well casing which uses a cutting element and a single means for moving the cutting elememt for use over a wide range of casing diameter.

In accordance with the invention a method of and apparatus for cutting substantially vertically disposed pipe, such as well casing disposed within a bore hole, is disclosed. A receiving member is positioned around the pipe at a predetermined distance from a desired cutting plane. A cutting element is mounted on a frame for moving circularly around and radially toward the pipe and supports mounted on the frame for locating the cutting element a predetermined distance from the receiving member while supporting the frame uniformly about the pipe. The frame is then positioned around the pipe and the supports are mounted on the receiving member to locate the cutting element within the desired cutting plane. The frame is then prevented from moving relative to the vertically disposed pipe and the cutting element is moved circularly around and radially toward the pipe to cut the pipe along the desired cutting plane at the predetermined distance from the receiving member.

BRIEF DESCRIPTION OF DRAWINGS

Other objects and advantages of the invention will become apparent upon reading the following detailed description and upon reference to the drawings, in which like reference characters are used throughout to designate like parts:

FIG. 4 is an enlarged elevational view, partly in section, of a portion of the invention shown in FIG. 2 taken in the direction of arrows 4—4.

FIG. 5 is an enlarged elevational view, partly in section, of a portion of the invention of shown in FIG. 2 taken in the direction of arrows 5—5.

FIG. 6 is an elevational view, partly in section, of the portion of the invention shown in FIG. 5 taken in the direction of arrows 6—6.

While the invention will be described in connection with the preferred embodiment and procedure, it will be understood that it is not intended to limit the invention to that embodiment and procedure. On the contrary, it is intended to cover all alternatives, modifications and equivalents as may be included within the spirit and scope of the invention as defined by the appended claims.

DETAILED DESCRIPTION OF THE INVENTION

Figure 1:
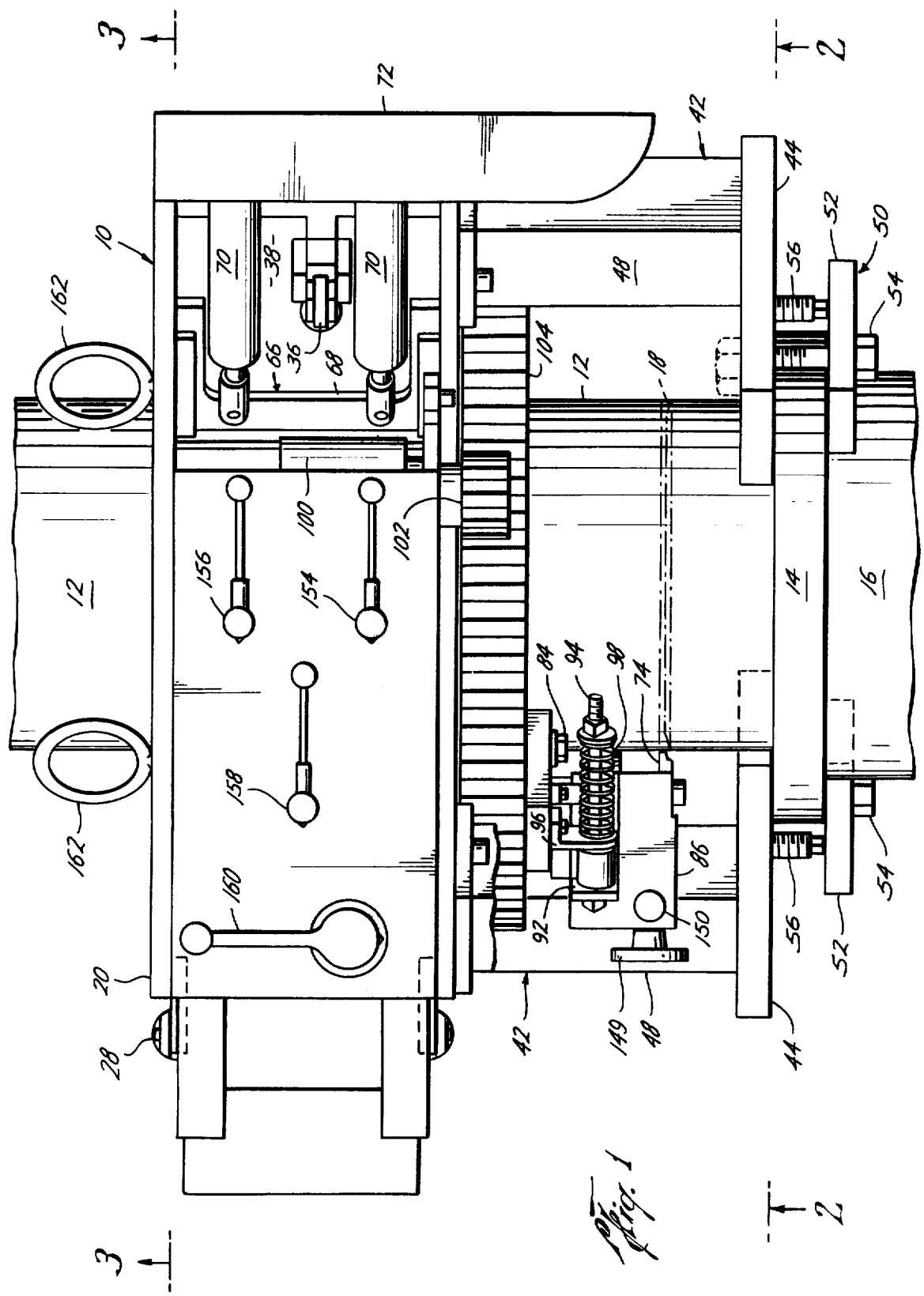
FIG. 1 is an elevational view, partly in section, of an apparatus for cutting substantially vertically disposed pipe constructed according to the present invention.
Figure 2:
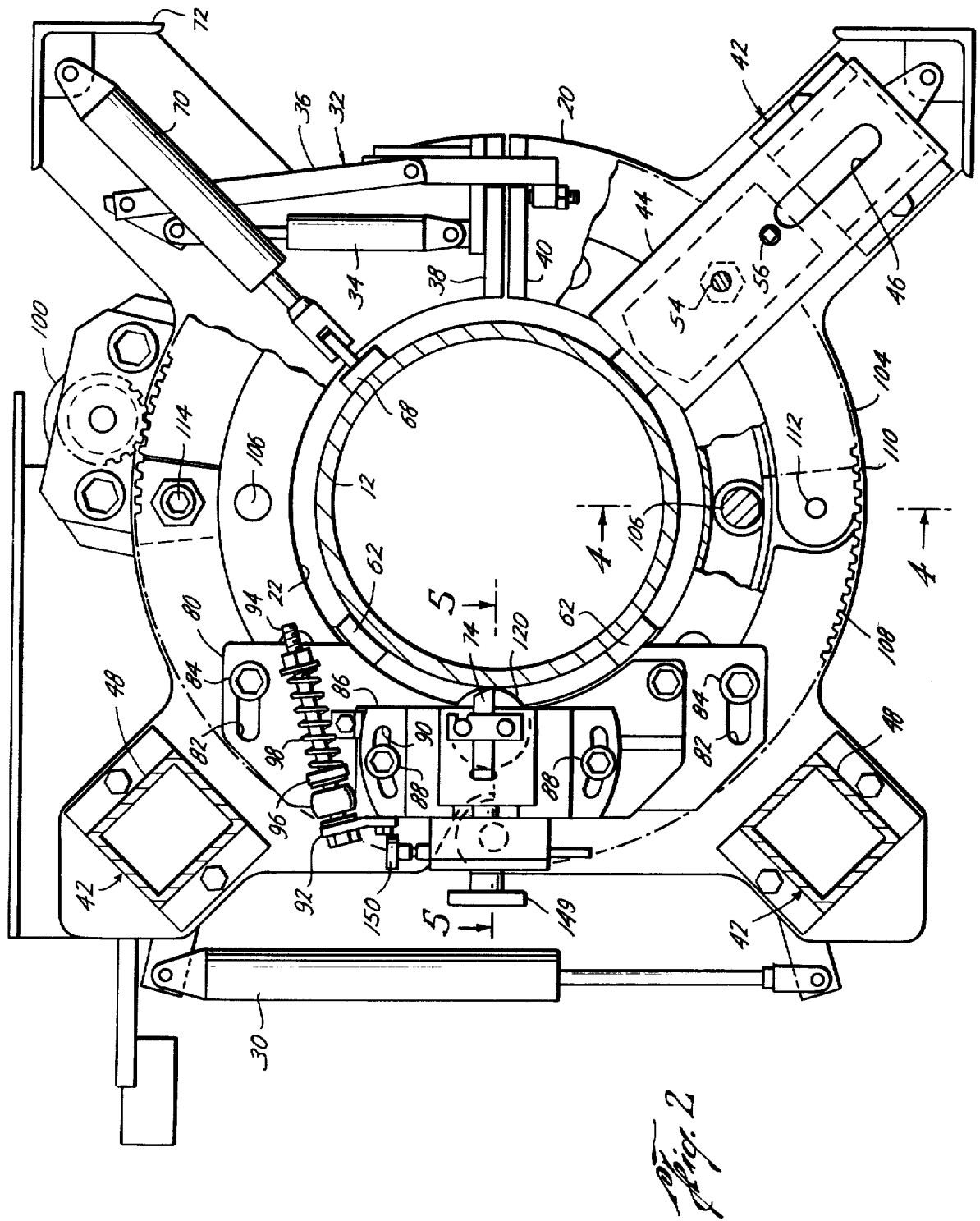
FIG. 2 is a plan view, partly in section, of a portion of the embodiment of the invention shown in FIG. 1 taken in the direction of arrows 2—2.
Figure 3:
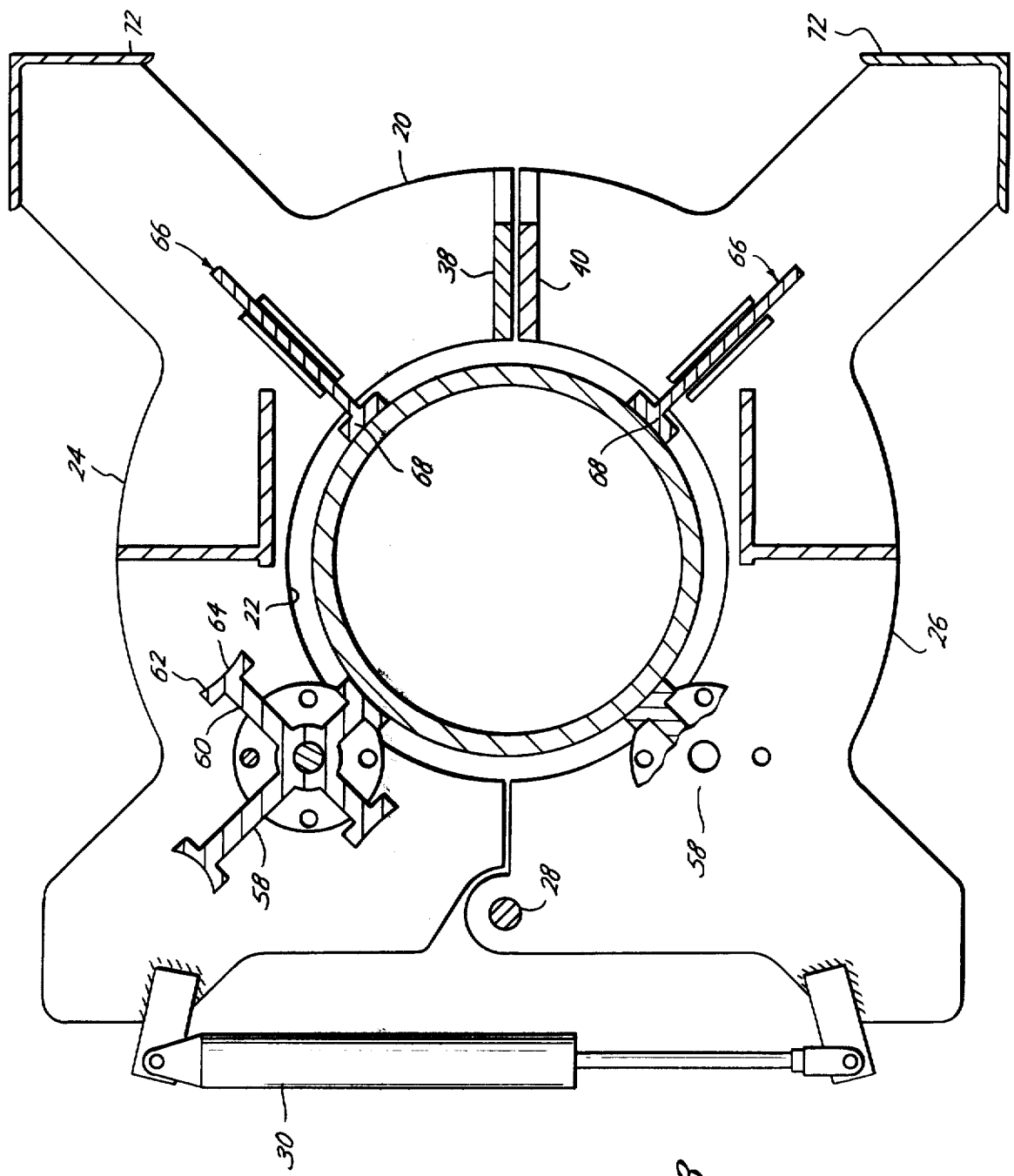
FIG. 3 is a plan view, partly in section, of a portion of the embodiment of the invention shown in FIG. 1 taken in the direction of arrows 3—3.

Turning now to FIGS. 1-3, there is shown apparatus 10 for cutting a substantially vertically disposed pipe 12. Apparatus 10 may be used to cut any substantially vertically disposed pipe 12 by positioning a receiving member about the pipe at a predetermined distance from a desired cutting plane 18. However, it is preferred that the pipe being cut is casing disposed within a bore hole and the cut be located a predetermined distance above a casing flange 14 disposed on a casing 16, either surface or intermediate casing, which positions cutting plane 18 substantially parallel to the upper face of the flange. This permits well head apparatus, such as casing spools, casing heads and flanges, to be added without interference.

Cutting apparatus 10 includes a frame 20 having a passageway 22 extending therethrough for mounting around the vertically disposed pipe 12. Preferably, passageway 22 is of circular cross section for concentric mounting around pipe 12. Frame 20 may be constructed of two halves, 24 and 26, which are pivotally mounted to each other at pivotal connection 28. Thus, frame 20 is disposed around pipe 12 by pivoting frame halves 24 and 26 from an opened position to a closed position. A closing piston 30 is mounted to each half, 24 and 26 for moving the opened ends together. Frame halves 24 and 26 are then locked into place by a locking mechanism 32, such as by locking piston 34 connected through linkage 36 to act against plates 38 and 40, which are provided on frame halves 24 and 26, respectively.

Mounted to frame 20 for extending longitudinally along pipe 12 are supports 42 for engaging with the frame receiving member, which as explained above is preferably a flange 14. Although four supports 42 are illustrated mounted to frame 20, it should be understood that a minimum of three supports can be used to provide the uniform support around pipe 12. Each support 42 has a foot 44 for engaging the receiving member positioned around pipe 12. Foot 44 includes a slot 46 for bolting to the receiving member, flange 14. A leg 48 mounts foot 44 to frame 20 and is adjustably mounted to frame 20, as with spacers (not shown). The distance between cutting plane 18 and the receiving member is thereby adjusted longitudinally along pipe 12.

A securing means 50 may be mounted with each foot 44 for preventing movement of frame 20 relative to pipe 12. The structure is, preferably, a plate 52 pivotally mounted to the bottom of foot 44 (a plate extending radially from leg 42 toward pipe 12) and has a means for urging plate 52 toward foot 44 for clamping flange 14 therebetween. Bolts 54 and 56 have been found to work extremely well for accomplishing this function.

A means is provided for centering passageway 22 around pipe 12 and for preventing movement of frame 20 relative to pipe 12. This centering and preventing means includes a pivotal clamp member 58 provided on each frame half, 24 and 26. Each pivotal clamp 58 has radially extending arms 60 of varying lengths and elongated pads 62 which permits pipes of varying diameters to be engaged by engaging faces 64 having varying radii of curvature for enhanced pipe gripping. As shown, clamp 58 preferably has four radially extending arms with a corresponding clamping pad 62 for engaging at least four different diameter pipes. A moveable clamp 66 is provided on each frame half, 24 and 26, and are in a diametrically opposed position to each pivotal clamp 58. Each moveable clamp 66 includes an elongated clamping pad 62 moved by the action of pistons 70 acting against angle arm supports 72. When desired, this arrangement may be used to prevent movement of frame 20 relative to pipe 12 without use of securing means 50.

As shown FIGS. 1, 2 and 5, a cutting element 74 is mounted with frame 20 for cutting pipe 12 along cutting plane 18. Preferably, cutting element 74 is a blade having a straight edge 76 for cutting pipe 12 along cutting plane 18 and a tapered edge 78 for beveling the edge of the pipe. By such construction, pipe 12 is cut and beveled in a single operation to be more efficient than the two step operation of cutting torch and machining.

As shown in FIGS. 1 and 2, cutting element 74 is mounted to frame 20 with a sector plate 80 having slots 82 provided therein to permit adjustable attachment to frame 20 by bolts 84 and a cutter head assembly 86 is mounted to plate 80 by bolts 88 extending through adjusting slots 90. A bracket 92 is mounted to cutter head assembly 86 and carries a bolt 94, which extends through extension 96 on plate 80. A spring 98 is disposed around bolt 94 to urge bracket 92, cutter head assembly 86 and cutting element 74 into engagement with pipe 12.

As shown in FIGS. 1, 2 and 4, a means is mounted with frame 20 for moving cutting element 74 circularly around and radially toward pipe 12 to cut the pipe at cutting plane 18. This means takes the form of a motor 100 mounted to frame 20 with a gear 102 attached to the motor for providing movement to a ring gear 104 with the ring gear being mounted around passageway 22 on frame 20 by rollers 106. Since frame 20 is opened for positioning around pipe 12, it is necessary that ring gear 104 be constructed for opening. Thus, ring gear 104 is made of two halves, 108 and 110, which are pivotally connected at pin 112 and by bolt 114 at the opening ends. Ring gear 104 is manufactured in a laminated fashion having outside portions 116 and inside portion 118 to facilitate manufacture of gear 104 and attachment of half 108 to half 110.

As shown in FIGS. 1, 5 and 6, apparatus is mounted with frame 20 for moving cutting element 74 radially toward pipe 12. This apparatus is disposed within cutting head assembly 86 and includes a friction wheel 120 which engages the outside periphery of pipe 12. Thus, in the event cutting element 74 is fed into pipe 12 too rapidly, wheel 120 will not feed element 74 into pipe 12 which aids in protecting cutting element 74 from damage. A spur gear 122 is mounted to wheel 120 for rotation therewith and turns spur gear 124, which is mounted to spur gear 126 for rotation therewith and turns spur gear 128 for rotating worm gear 130. Worm gear 130 engages a drive wheel 132 and 134 which turn spur gears 132A and 134A, respectively. A control arm 136 is journalled to cutter head assembly 86 about a feed rod 138. A spur gear 140 is mounted about feed rod 138 and engage spur gears 142 and 144, which are rotatably mounted to control rod 136 for engaging with spur gears 132A and 134A, respectively, as explained below. Threads 146 are provided on feed rod 138 and engage matching threads on a cutting element mount 148. Thus, as feed rod 138 is turned by gear 140 or by handwheel 149, cutting element 74 is fed into pipe 12. Moreover, by providing different gear ratios on gears 132A and 142 and on gears 134A and 144, the rate of feed of cutting element 74 into or out of pipe 12 may be adjusted to increase the rate of radial movement of cutting element 74 in response to a decrease in the diameter of different pipes being cut, which permits a wide range of pipe diameters to be cut with a single moving means. As shown, three indentations are provided on the end of control rod 136 for engaging with a stop member 150 mounted with cutter head assembly 86. These indentations are used to indicate the direction of feed toward or away from the pipe, as well as an idler position.

As shown in FIG. 1, cutting apparatus 10 has a control panel 152 for controlling the cutting of pipe 12. Preferably, apparatus 10 is controlled by hydraulic fluid so panel 152 includes a valve 154 for opening and closing frame 20 around pipe 12 by activating piston 30 a valve 156 for latching and unlatching frame portion 24 to frame portion 26 by activating piston 34, a valve 158 for clamping and unclamping frame 20 around pipe 12 by activating pistons 70 and a valve 160 for cutting pipe 12 by activating motor 100.

To position cutting apparatus 10 around pipe 12, frame 20 is positioned around the pipe by rings 162 held with conventional apparatus (not shown), such as a hoist. The frame halfs 24 and 26 are closed around pipe 12 and latched together. Frame 20 is lowered toward flange 14 until feet 44 engage the upper face of the flange, pads 68 are then moved against pipe 12 to shift the frame until the pipe is centered within passageway 22 and movement of frame 20 relative to the pipe is prevented. Plate 52 is then urged against the bottom face of flange 14 for securing frame 20 to flange 14 which also prevents movement of the frame relative to pipe 12. Wheel 120 is then moved into engagement with pipe 12, the feed rate selected by control rod 136 and motor 100 started for moving cutting element 74 circularly around and radially toward the pipe to thus cut pipe 12 along cutting plane 18.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed with reference to other features and subcombinations. This is contemplated by and is within scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A method of cutting substantially vertically disposed pipe, comprising the steps of:
   (a) providing receiving means immovably secured to the pipe at a predetermined distance from a desired cutting plane;
   (b) mounting a cutting element on a frame for moving circularly around and radially toward the pipe;
   (c) mounting support means on the frame for supporting the frame uniformly about the pipe;
   (d) positioning the frame around the pipe;
   (e) mounting the support means in immovable relation on the receiving means to locate the cutting element within the desired cutting plane;
   (f) securing the frame against movement relative to the vertically disposed pipe, said support means, and said receiving means; and
   (g) moving the cutting element circularly around and radially toward the pipe to cut the pipe along the desired cutting plane at the predetermined distance from the frame receiving means.

2. The method of claim 1, wherein the pipe being cut is well casing, the receiving member is a casing head flange and the predetermined distance being sufficient to mount well head apparatus to the casing head flange without interference with the casing.

3. The method of claim 1, wherein the cutting element mounted on the frame is a blade having a straight edge, the blade being mounted on the frame with the straight edge extending across the cutting plane for cutting the pipe along the plane by movement circularly around and radially toward the pipe.

4. The method of claim 3, wherein the blade has a tapered edge, the blade being mounted on the frame with the tapered edge extending at an angle relative to the cutting plane for beveling the edge of the pipe while cutting the pipe along the cutting plane.

5. A method of cutting substantially vertically disposed well casing, comprising the steps of:
   (a) providing a frame for mounting on a casing head flange, the frame having adjustable supports for engaging with the casing head flange to provide uniform support for the frame around the casing;
   (b) mounting a cutting element on the frame for moving circularly around and radially toward the casing;
   (c) adjusting the height of supports to locate the cutting element a predetermined distance above the flange when the frame is mounted thereon;
   (d) positioning the frame around the casing;
   (e) mounting the supports on the flange to position the cutting element at the predetermined distance above the flange;
   (f) preventing the frame from moving relative to the vertically disposed well casing; and
   (g) moving the cutting element circularly around and radially toward the casing along a desired cutting plane at the predetermined distance from the casing head flange.

6. The method of claim 5, wherein the cutting element mounted on the frame is a blade having a straight edge, the blade being mounted on the frame with the straight edge extending across the cutting plane for cutting the casing along the plane by movement circularly around and radially toward the casing.

7. The method of claim 6, wherein the blade has a tapered edge, the blade being mounted on the frame with the tapered edge extending at an angle relative to the cutting plane for beveling the edge of the casing while cutting the casing along the cutting plane.

8. Apparatus for cutting a substantially vertically disposed pipe, comprising:
   (a) a frame mountable around the vertically disposed pipe;
   (b) a cutting element mounted with said frame for cutting the pipe along a cutting plane;
   (c) at least three supports adjustably mounted with said frame for supporting said frame uniformly around the pipe; each said support having
      (i) a foot for engaging a receiving member positioned about the pipe and
      (ii) a leg mounting the foot to said frame, the leg being adjustably mounted with said frame for locating the cutting element a predetermined distance from the receiving member;
   (d) means mounted with said frame for preventing movement of said frame relative to the pipe; and
   (e) means mounted with said frame for moving said cutting element circularly around and radially toward the pipe to cut the pipe at the cutting plane at the predetermined distance from the receiving member.

9. The apparatus of claim 8, wherein the pipe to be cut is well casing disposed in a bore hole, the receiving member is a casing flange and the predetermined distance is above the flange sufficiently to mount well head apparatus to the flange without interference with the casing.

10. The apparatus of claim 9, wherein the foot of each support extends radially from the leg toward the casing for engaging the top of flange and the cutting plane lies parallel to the top face of the flange.

11. The apparatus of claim 9, including securing means mounted with each foot for preventing movement of said frame relative to the casing.

12. The apparatus of claim 11, wherein the foot of each support extends radially from the leg toward the casing for sitting on top of the flange and said securing means includes a plate pivotally mounted with the foot and means for urging the plate to clamp the flange against the foot.

13. The apparatus of claim 9, wherein each support includes spacers mounted between the leg and said frame for adjustably mounting the leg with said frame to position said cutting element the predetermined distance above the flange.

14. The apparatus of claim 9, wherein said cutting element is a blade having a straight edge extending along the cutting plane for cutting the casing along the plane and an edge tapering relative to the straight edge for beveling the edge of the casing while cutting the casing along the plane.

15. The apparatus of claim 9, wherein said cutting element moving means includes a laminated ring gear for moving the element around the casing and a motor geared thereto for moving the ring gear.

16. The apparatus of claim 8, including securing means mounted with the foot of each support for preventing movement of said frame relative to the pipe.

17. The apparatus of claim 8, wherein the foot of each support extends radially from the leg toward the pipe for sitting on top of the receiving member.

18. The apparatus of claim 8, wherein each support includes spacers mounted between the leg and said frame for adjustably mounting the leg with said frame to position said cutting element the predetermined distance above the receiving member.

19. The apparatus of claim 8, wherein said cutting element is a blade having a straight edge extending along the cutting plane for cutting the pipe along the plane and an edge tapering relative to the straight edge for beveling the edge of the pipe while cutting the pipe along the plane.

20. The apparatus of claim 8, wherein said cutting element moving means includes a laminated ring gear for moving the element around the pipe and a motor geared to the ring gear for moving the ring gear.

* * * * *